Aug. 21, 1945.　　　　G. SLAYTER　　　　2,383,168
APPARATUS FOR MELTING GLASS
Filed May 23, 1944
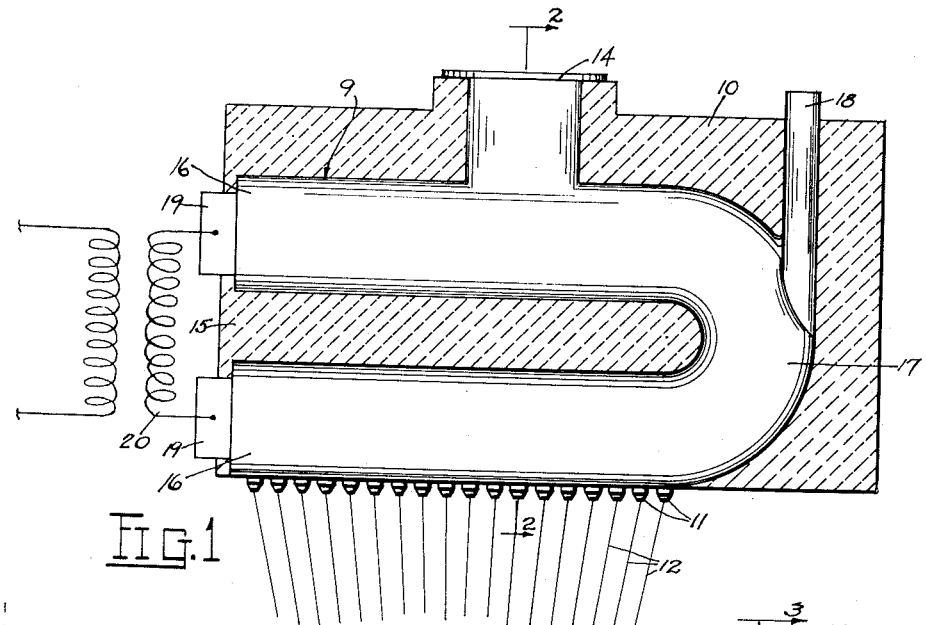
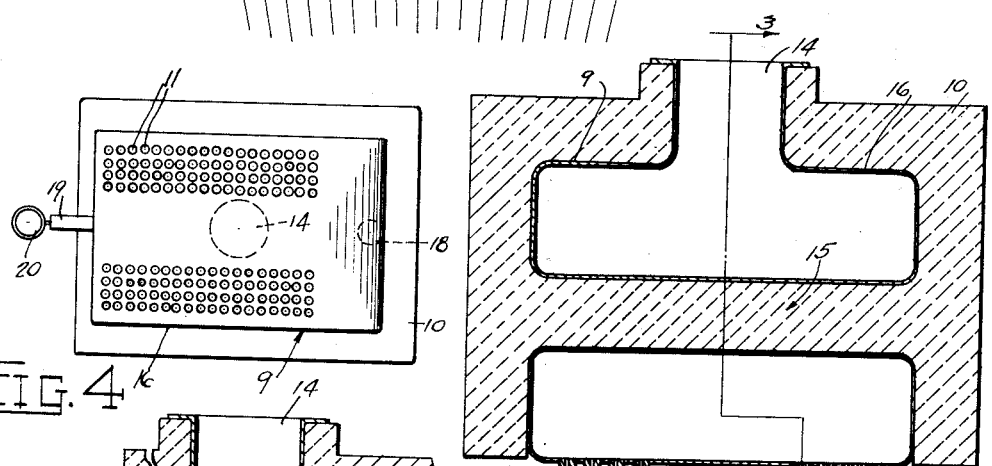
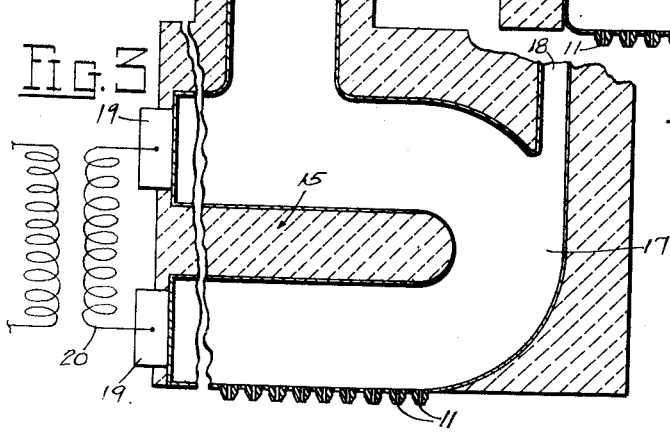
INVENTOR.
Games Slayter
BY
Attorneys.

Patented Aug. 21, 1945

2,383,168

UNITED STATES PATENT OFFICE 2,383,168

APPARATUS FOR MELTING GLASS

Games Slayter, Newark, Ohio, assignor to Owens-Corning Fiberglas Corporation, a corporation of Delaware Application May 23, 1944, Serial No. 536,995

6 Claims. (Cl. 13—6)

This invention relates to improvements in glass feeder or bushing constructions of the type employed in the production of fibers or filaments from a molten body of material such, for example, as glass.

Fibers or extremely fine continuous filaments have been successfully produced by electrically heating a body of glass, or other material having similar characteristics, to a molten state in a metal bushing or feeder and by pneumatically, mechanically or otherwise drawing out streams of molten material flowing from a multiplicity of small orifices in the bushing. The quality of the resulting fibers or filaments as well as the rate at which the latter can be produced depends to a great extent upon the viscosity of the molten material in the bushing which, in turn, depends not only upon the control of the temperature of the molten body of material, but also upon the ability to maintain the temperature of this material uniform throughout the entire operation. It has been found that the material to be melted is best handled when it is in uniformly shaped units of substantially equal weight. To this end, I prefer to use glass making materials in the form of already formed glass marbles or batch which has been briquetted to a uniform shape.

Difficulty in maintaining the molten material adjacent the discharge orifices at the proper uniform temperature to obtain the required viscosity is aggravated by the necessity of introducing cold marbles or briquettes of the material into the bushing to replenish the supply of molten material in the latter. In the usual melter or bushing of the present general type, the molten glass is discharged directly from the chamber in which it is melted so that at best only a few inches separates the charging zone from the discharging area. The introduction of relatively cold marbles or briquettes into the bushing creates a substantial thermal gradient through the body of molten glass which results in a shock transmitted to the molten material adjacent the bushing orifices. This tends to reduce the temperature and produce a local cold spot in the molten material that is directly beneath the point at which the marbles or briquettes are charged into the bushing.

It is, therefore, one of the principal objects of this invention to minimize any tendency for thermal shock to affect the viscosity of the molten material adjacent the orifices by providing a bushing having, in effect, an air space interposed between the portion of the bushing adapted to receive the briquettes or marbles and the discharge portion containing the orifices.

Electrical heating of the usual bushing is accomplished by connecting the bushing in a circuit so that current flowing from end to end through the bushing walls and to a lesser degree through the molten glass heats the bushing to the required high temperature. Due to the high temperature required and the high conductance of the metal walls, which are of platinum or platinum alloy, the current through the bushing is very high, amounting to hundreds of amperes. This necessitates heavy leads and connections and a large transformer, one end of the secondary coil of which is attached directly to one end of the bushing, the other end of the secondary being connected by a large bus bar to the other end of the bushing.

This bus bar of necessity extends along one side of the bushing and hence, in addition to being a factor in power loss, creates a magnetic field that influences the path of current flow in the bushing walls to an extent interfering with the desired uniformity of heating and subjecting the bushing to strains that shorten its life. The field set up by the heavy current in the bus bars is of very high strength and the bushing is in close proximity to the bus bar, causing the current through the bushing to take a path as far removed as possible from the bar. In the usual installation this causes a current flow through the wall of the bushing farther from the bus bar considerably greater than that through the wall nearer the bar. As a result, uniform heating of the bushing is made difficult.

It is another object of the invention to provide a bushing construction whch is adapted to overcome the above difficulties by eliminating the necessity for a long bus bar and which tends to improve the operating efficiency of the bushing.

Another object of the invention is to provide a divided glass melting bushing so constructed that electrical current flowing therethrough produces a substantially uniform temperautre throughout the bushing.

It is a further object of the invention to provide a glass melter having interconnected charging and discharging zones whereby the glass is subjected to a mixing action as it flows from one zone to the other.

More particularly, the present invention contemplates a substantially U-shaped bushing supported with the leg portions extending one above the other in substantially parallel vertically spaced horizontal planes. Although the two leg portions are connected at one end by the base of the U, nevertheless, the lower leg of the U-shaped bushing containing the discharge orifices is separated from the upper leg containing the inlet opening for marbles or briquettes of the selected material by an air space. The arrangement is such that thermal shocks resulting from feeding cold marbles or briquettes into the molten material in the upper leg of the U-shaped bushing are prevented from being directly transmitted to the body of molten material in the bottom leg of the bushing. Thus, it is possible to maintain the temperature of the molten material in the bottom or discharge leg of the bushing substantially uniform notwithstanding periodic introduction of cold marbles or briquettes into the bushing to replenish the supply of material in the latter.

Another feature of this invention is to provide a bushing of the general character previously set forth constructed of a material capable of withstanding high temperatures and adapted to be heated to sufficiently high temperatures to melt the material deposited therein by passing an electric current therethrough. In this connection it will be noted that the U-shape of the bushing also renders it possible to employ the extremities of the legs as the opposed terminals for connecting the bushing to the source of electric supply and thereby enables omitting the usual long, heavy bus bar employed in the past to connect at least one end of the bushing to the source of electric supply.

The elimination of the bus bar referred to above is advantageous not only because of the saving in heating current realized by omission of the high induction losses accompanying the use of a long bus bar, but also because it eliminates the field resulting from the current passing through such a bar and which would have a tendency to react on the heating current flowing through the bushing and cause heavier currents to flow through the side of the bushing remote from the bus bar. Such action, of course, complicates temperature control of the molten material in the bushing and makes it difficult to maintain the material at the required viscosity for the most advantageous flow characteristics.

The foregoing, as well as other objects, will be made more apparent as this description proceeds, especially when considered in connection with the accompanying drawing, wherein:

Figure 1 is a diagrammatic view showing a typical installation of a glass melting bushing constructed in accordance with this invention;

Figure 2 is a longitudinal sectional view through a bushing constructed in accordance with this invention;

Figure 3 is a sectional view taken substantially on the plane indicated by the line 3—3 of Figure 1; and Figure 4 is a bottom plan view of the bushing.

Figure 1 of the drawing illustrates diagrammatically a typical installation embodying a bushing constructed in accordance with this invention. In general the reference character 9 indicates a feeder or bushing of highly conductive metal adapted to melt and contain a body of molten or viscous material such, for example, as glass or a substance having characteristics similar to glass. The bushing is suitably enclosed within a refractory block or body 10 which serves to insulate it against heat losses from the molten material. The bottom of the bushing 9 is provided with a multiplicity of predeterminedly spaced discharge orifices 11 of small diameter, and the viscosity of the material in the bushing is carefully regulated to insure the flow of material through the orifices in the form of streams 12. In actual practice the streams 12 are mechanically, pneumatically or otherwise drawn or attenuated to form fine filaments or fibers, and any suitable mechanism, not shown herein, may be provided for this purpose.

In the present instance, the bushing 9 is electrically heated to a temperature sufficient to convert a body of material in the bushing from a solid condition to a molten state having the required viscosity to insure proper flow of the material through the orifices 11 in the bottom of the bushing. Accordingly the bushing is formed of a material capable of not only withstanding considerable temperatures over long periods of use, but also possessing good heat and electrical conducting characteristics. One material possessing the required qualities is platinum or some alloy of platinum, although the invention is not restricted to the use of any specific material.

In instances where it is desired to form the fibers or filaments of glass, heating currents in the range of from 200 to 500 amperes are frequently employed to generate the heat required to convert solid glass to a molten body of glass having the desired viscosity. Extreme care is taken to accurately control or regulate the heating current or temperature so as to maintain the body of glass immediately adjacent the discharge orifices 11 of a uniform viscosity found most advantageous in insuring a continuous easy flow of solid glass streams from the discharge orifices 11. Any appreciable variation of the temperature results in an interrupted flow of glass through the orifices which frequently causes the fibers to break as they are attenuated and thus impair the operation of the bushing.

In the present instance, the bushing 9 is replenished with solid glass by periodically introducing briquettes or marbles of glass into the bushing through an intake open 14 formed in the top wall of the bushing. As previously mentioned, the introduction of cold glass into a normally constructed bushing tends to produce a thermal gradient within the molten body which reaches the glass immediately adjacent the discharge orifices 11 and tends to reduce the temperature of this body of glass sufficiently to affect the viscosity of the same. This aggravates the difficulties of controlling the heating currents and viscosity of the molten body of glass adjacent the discharge orifices 11.

The above objection is overcome to a great extent by providing an insulating space 15 between the charging zone of the bushing and the discharge orifices 11 of the latter. In the specific embodiment of the invention shown in the drawing the space 15 is created by forming the bushing in the form of a U having leg portions 16 of substantially equal length and breadth connected in communication with each other by the base 17 of the U. In actual practice the bushing is supported with the leg portions 16 spaced one above the other in substantially parallel horizontal planes. The space 15 between the legs 16 of the bushing may be filled with refractory or other material to provide insulation between the upper and lower members and further restrain transmission of the thermal changes resulting from cold batch materials.

The bottom leg 16 of the bushing 9 is formed with the discharge orifices 11 previously described, and the top leg portion 16 is equipped with the intake opening 14 as well as with a suitable vent 18 to enable gases formed during melting of the batch to readily escape from the bushing. These gases in becoming mixed with the glass form bubbles or seeds in the glass if not permitted to escape, and find their way to the orifices 11 where they enter and cause hollow fibers which break when they are attenuated. It is important to note at this time that the base 17 of the U or the portion of the bushing establishing communication between the legs is offset laterally with respect to both the discharge orifices 11 and the intake opening 14. With this construction any thermal shock occasioned by depositing a cold glass marble or batch briquette into the top leg portion 16 of the bushing is prevented from being directly transmitted to the molten body of glass in the bottom leg or discharge portion of the bushing and thus has very little or no effect on the temperature or viscosity of the glass in the bottom leg of the bushing.

In the present bushing construction the ends of the legs 16 are relatively closely spaced and terminal leads 19 are formed thereon for connection to the secondary coil 20 of a suitable transformer. This arrangement enables omitting the usual relatively long heavy bus bar required with conventional electrically heated bushings and thereby effects a substantial reduction in induction losses and also contributes to simplification of current and temperature control.

Control is also bettered in a bushing of the present construction by the tendency of the greater flow of current to follow the outer walls rather than the inner walls. This counteracts to some extent the radiant losses from the exposed or outer surfaces of the bushing. The amount of radiation between the inner walls is lessened due to their close proximity so that the mutual transfer of heat results in losses which are relatively less from the walls carrying the lighter flow of current.

Various modifications may be made within the spirit and scope of the appended claims.

I claim:

1. Apparatus for flowing a multiplicity of streams of material comprising a generally U-shaped container adapted to contain a body of molten material and supported with one leg portion positioned directly opposite the other leg portion, an intake opening formed in the top wall of one leg portion of the container at a point offset laterally from the connecting base portion of the U-shaped container and a plurality of discharge orifices in the bottom wall of the other leg portion, and means for supplying melting heat to the contents of said container.

2. Apparatus for flowing a multiplicity of streams of glass comprising a generally U-shaped bushing adapted to contain a molten body of glass and supported with one leg portion spaced directly above the other leg portion and communicating with the latter through the base portion of the U-shaped bushing, the uppermost leg of the bushing having an opening in the top wall for receiving glass briquettes to replenish the supply of molten glass in the bushing and the lowermost leg portion of the bushing having a plurality of orifices through which glass flows in the form of streams, and means respectively electrically connecting the extremities of the leg portions to a source of heating current.

3. Apparatus for melting glass and flowing it in a multiplicity of fine streams comprising a generally U-shaped container including vertically spaced legs forming separate charging and discharging zones disposed one over the other, having charging and discharging openings respectively, one end of said zones connected to form a passage therebetween, and means connecting with the opposite end of each said zone for electrically heating the container and thereby causing the molten glass to flow toward the discharging zone.

4. Apparatus for flowing streams of molten glass comprising a metallic walled container of substantially U-shaped construction, the spaced apart legs of said U forming melting and discharging chambers arranged horizontally one over the other and having a charging opening in the upper chamber and discharge orifices in the lower chamber, and means connected with the ends of said legs for passing an electric current through the walls of said container to melt and flow glass contained therein.

5. An apparatus for flowing streams of molten glass comprising a generally U-shaped metallic container the legs thereof providing elongated melting and discharging chambers respectively arranged one over the other in vertically spaced relation, said chambers having an intercommunicating passage at one end through which the molten glass flows into said discharging chamber, said chambers having respectively charging and discharging orifices disposed remotely from said passage, and means connected to the ends of the chambers opposite the passage adapted to transmit melting heat to material placed therein and control the temperature of the streams flowing from said discharge openings.

6. A container for melting and flowing fine streams of molten glass comprising a continuous walled channel, rectangular in cross section, bent in the form of a U and disposed horizontally with one leg of the U lying over and spaced from the other, the inner and outer opposed walls defining an upper melting chamber and a lower discharging chamber, said upper chamber provided with a charging orifice for receiving cold glass making materials to be melted and said lower chamber having discharge orifices through which the molten glass flows by gravity, and electrical connections at either end of the channel for connecting means capable of inducing a flow of current through said walls for heating the container to melt the glass therein whereby said current flow tends to counteract heat losses by radiation from said walls.

GAMES SLAYTER.